United States Patent [19]

Apple et al.

[11] Patent Number: 5,258,882
[45] Date of Patent: Nov. 2, 1993

[54] SINGLE TAPE CARTRIDGE ACCESS PORT

[75] Inventors: James L. Apple, Boulder; Ronald L. Campbell, Thornton, both of Colo.

[73] Assignee: Storage Technology Corporation, Louisville, Colo.

[21] Appl. No.: 737,421

[22] Filed: Jul. 29, 1991

[51] Int. Cl.[5] .............................................. G11B 15/68
[52] U.S. Cl. ...................................................... 360/92
[58] Field of Search ............. 360/92, 71, 98.04, 98.06; 369/34, 36, 37; 414/932

[56] References Cited

U.S. PATENT DOCUMENTS 4,817,071 3/1989 Carlson et al. ...................... 369/34
4,864,438 9/1989 Munro ..................................... 360/92

*Primary Examiner*—Robert S. Tupper
*Attorney, Agent, or Firm*—Duft, Graziano & Forest

[57] ABSTRACT

An access port for loading single tape cartridges into and retrieving single tape cartridges from an automated tape cartridge library system. A door is rotatably mounted in an opening in an exterior panel of the library system. The shape of the door is designed so that the opening is blocked at all times, regardless of the position of the door. A tape cartridge tray is mounted on the rear side of the door, slanted downward at a ten degree angle. The downward slant of the tray enables the robot to accurately find tape cartridges placed therein and restrains the tape cartridge from accidental dislodgement. A latch mechanism is provided to prevent the door from rotating when the robot is operating near the access port. The latch has an actuator preventing unlatching of the door. The actuator is activated by the operating system when it is safe to rotate the door. A tape cartridge is inserted into the tray and the actuator is activated to unlatch the door. The door is unlatched and rotated so the tape cartridge is removed.

3 Claims, 7 Drawing Sheets

SINGLE TAPE CARTRIDGE ACCESS PORT

FIELD OF THE INVENTION

The present invention relates to field of access ports for an automated tape cartridge library system, particularly for single tape cartridge access ports.

PROBLEM

Presently, in automatic tape cartridge library systems, tape cartridges are loaded into the library and retrieved from the library in large quantities at a time. The bulk transfer of tape cartridges into and out of the libraries normally occurs through large ports in the library structure. Once an operation is started on one of these large ports, it must be allowed to run to completion without interruption.

At the present time, there is no way for a single cartridge to be loaded into the library or retrieved from the library without going through a bulk transfer of cartridges. Occasionally it becomes necessary to load a single tape cartridge into the library system, either for directly inputting into a tape drive unit, or for storage therein, or to retrieve a single tape cartridge from the library system. When this need arises, it is complicated and time-consuming, thus expensive, to manipulate the system to load or retrieve the single tape cartridge. It may be necessary to interrupt the operation of a large port and the tape cartridge loaded or retrieved through a large port used to load and retrieve a large volume of cartridges at a time.

Therefore, a need presently exists for an access port device for loading a single tape cartridge into and retrieving a single tape cartridge from an automated tape cartridge library system without interfering with the operation of the system.

The present invention solves these and other problems by providing an access port for single tape cartridges. The access port of the present invention enables a single tape cartridge to loaded into an automated tape cartridge library system and retrieved therefrom.

The present invention prevents damage to the system by blocking the access port opening at all times.

The access port of the present invention cooperates with the operating system to load and retrieve single tape cartridges into and out of the library system.

The present invention provides an access port having a tray for receiving tape cartridges and a sensing mechanism to signal when a tape cartridge has been fully inserted therein.

The present invention also provides a target to allow the library system to accurately and repetitively find the tape cartridge in the tray.

The present invention provides a latching mechanism on the access port to prevent accidental movement of the loading and retrieval mechanism.

The present invention provides an access port which can load and retrieve single tape cartridges with priority over other system operations and without interfering with the operation of the system.

The present invention solves these and other problems by providing a priority access port as further described in the drawings and the detailed description of a preferred embodiment.

SUMMARY OF THE INVENTION

The present invention provides an access port for automated tape cartridge library systems for loading single tape cartridges into the systems and retrieving single tape cartridges from the systems. One such system that the present invention has application in is disclosed in U.S. Pat. No. 4,864,438, issued to Munro. This system uses dodecahedron shaped library modules with robot arms centrally pivotal in the modules to transfer tape cartridges. The access port of the present invention allows single tape cartridges to be loaded or retrieved without interference with the operation of the system.

A door is rotatably mounted within the opening formed in an exterior panel of a library module extending into the interior of the library module. The shape of the door is designed so that the opening is blocked at all times, regardless of the position of the door. A tape cartridge tray is mounted on the rear side of the door, slanted downward at a ten degree angle. The downward slant of the tray enables the robot to accurately find tape cartridges placed therein. Also, the downward slant restrains the tape cartridges there from accidental dislodgement.

Target inserts are attached on the tape cartridge tray to provide reference points for optical sensing devices on the robot. These target inserts align the robot so that the tape cartridge retrieval mechanism on the robot can grasp tape cartridges in the tray. The tray has notches formed therein to provide clearance for the tape cartridge retrieval mechanism. The notches also provide clearance for the operator to manually grasp tape cartridges in the tray.

A sensor arm is pivotally mounted under the tray with a portion extending into the tray. The sensor arm is pivoted when a tape cartridge is fully inserted in the tray. This pivoting action causes the sensor arm to flag an optical sensor to send a signal to the operating system and to an alphanumeric display mounted on the exterior that a tape cartridge is fully inserted.

A latch mechanism is provided to prevent the door from rotating when the robot is operating near the access port. The latch has an actuator preventing unlatching of the door. The actuator is activated by the operating system when it is safe to rotate the door. The status of the latch is also displayed on the alphanumeric display.

A gas spring is also provided for damping the rotation near the fully open and fully shut positions to prevent damage to the access port and library system.

In operation, the device is normally closed and unlocked. If an operator wishes to put a cartridge into the tape library, the device is opened by activating the latch. The device will be forced open by the action of the gas spring. The operator places the cartridge in the tray and closes the device. The sensor located under the tray senses the presence of the cartridge and notifies the operating system. The device is then electrically locked until the robot picks up the cartridge and transfers it to storage or a tape drive. As soon as the cartridge is removed from the tray, the device is unlocked. These operations are displayed on the alphanumeric display as they progress.

Retrieval of a single tape cartridge from the library system operates in a similar fashion. The operator requests a tape cartridge using the system control. The device is locked and the operating system moves the robot to the desired tape cartridge where it is retrieved. The robot then transfers the tape cartridge to the tape cartridge tray on the door by aligning the arm through the an optical sensing device and the target inserts on the tray. The tape cartridge is then inserted into the tray. The sensor arm flags the optical sensor on the tray once the tape cartridge is fully inserted in the tray at which time the operating system will activate the actuator to allow the door to be unlatched. The operator will unlatch the door and rotate the door until the tray is accessible. The tape cartridge is then removed and the door rotated to the closed position.

These and other features of the invention will be evident from the ensuing detailed description of a preferred embodiment taken in conjunction with the drawings.

DETAILED DESCRIPTION

The present invention provides an access port for loading and retrieval of single tape cartridges into an automated tape cartridge library system, such as the library system disclosed in U.S. Pat. No. 4,864,438, issued to Munro on Sep. 5, 1989. The access port of the present invention is able to load or retrieve a single tape cartridge with priority over the other library operations.

A preferred embodiment of the present invention is illustrated in FIGS. 1-8. It is to be expressly understood that the exemplary preferred embodiment is for descriptive purposes only and is not meant to limit the present invention. Other variations and modifications are considered to be within the scope of the present inventive concept.

Figure 1:
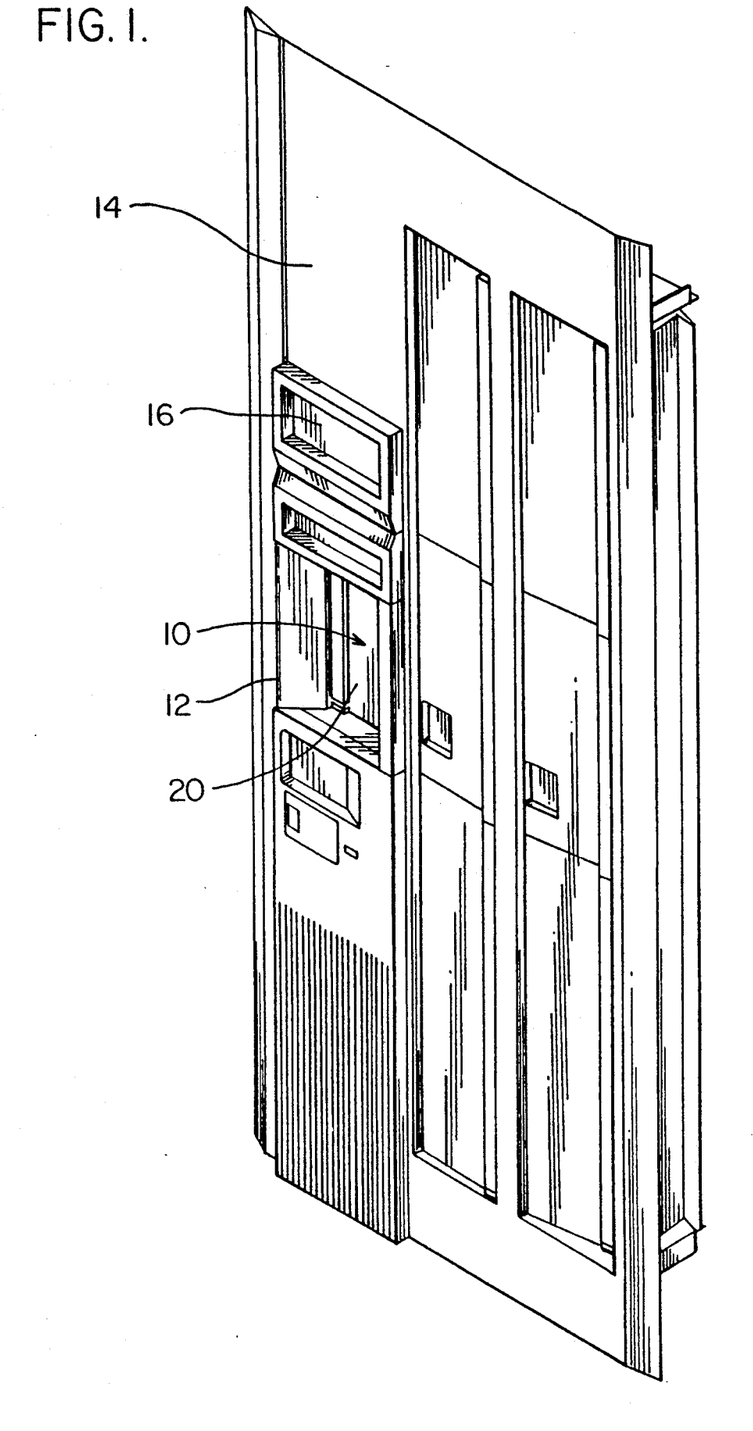
FIG. 1 is a perspective view of the present invention mounted in an exterior panel of an automated tape cartridge library system.
Figure 2:
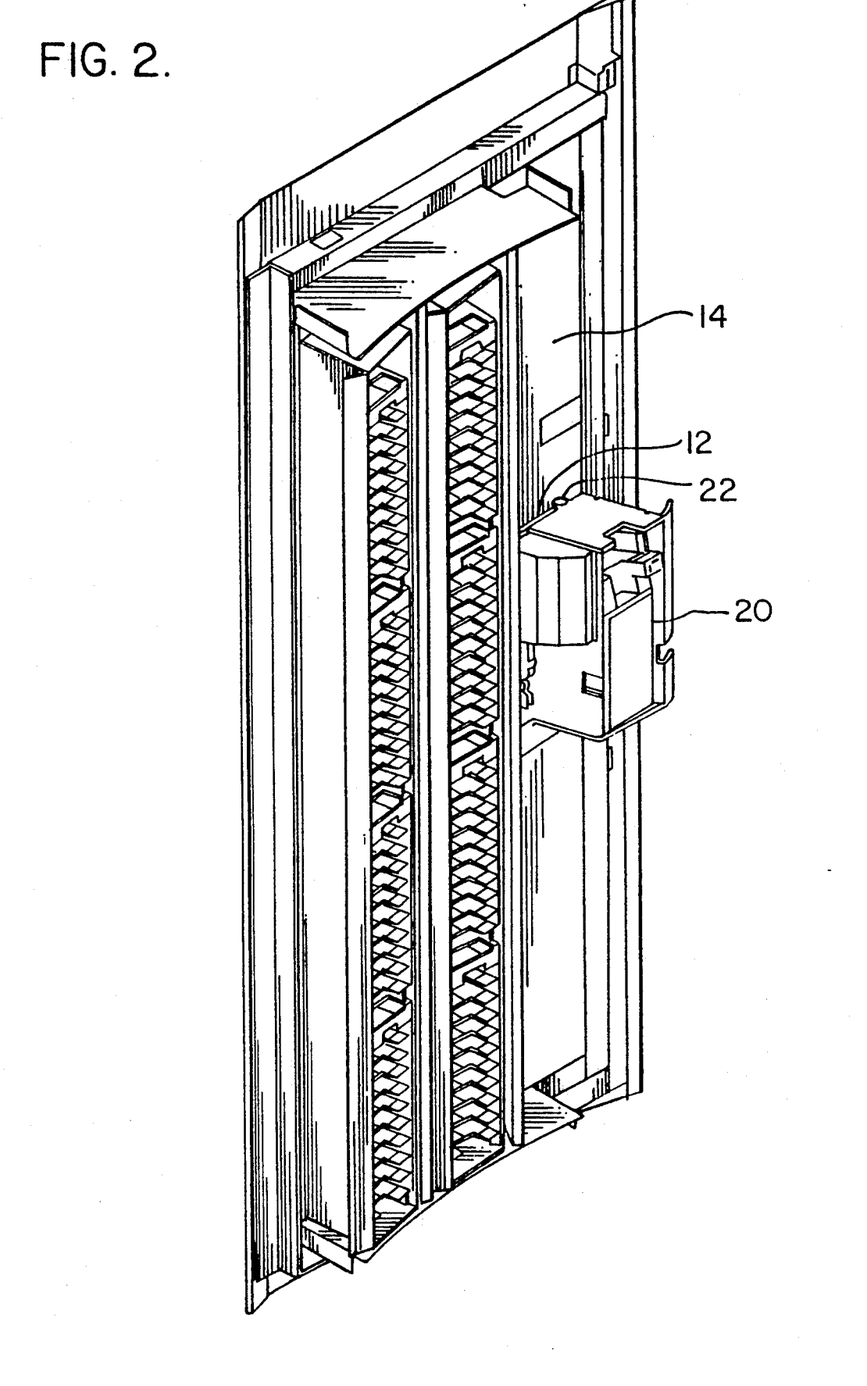
FIG. 2 is a rear perspective view of FIG. 1.

Access port 10, shown in FIG. 1, is mounted in opening 12 of panel 14 which is mounted on the automated tape cartridge library system (not shown), such as the system disclosed in U.S. Pat. No. 4,864,438. The automated tape cartridge library system disclosed therein includes a dodecahedron shaped library module with a robot pivotally mounted in the center of the module. The robot includes a tape cartridge retrieval mechanism to selectively retrieve and transfer tape cartridges between the library module and tape drive units. Tape cartridges were previously loaded in bulk into these systems. Loading or retrieval of a single tape cartridge was not possible without numerous complications, including shutting down the main loading and retrieval system. It is to be expressly understood that the present invention is not limited to this system but includes other types of systems with which the present invention may have application.

Access port 10 also includes alphanumeric display 16 which reflects the status of the system and access port. Access port door 20 is rotatably mounted within opening 12, as discussed in detail below. Door 20, shown in FIG. 2, extends into the interior of the library module (not shown). Door 20 is mounted to pivot about axis 22 relative to panel 14 in opening 12 through an angle of approximately 127 degrees, in this particular embodiment, due to the dodecahedron shape of the library module.

Door Mechanism

Figure 3:
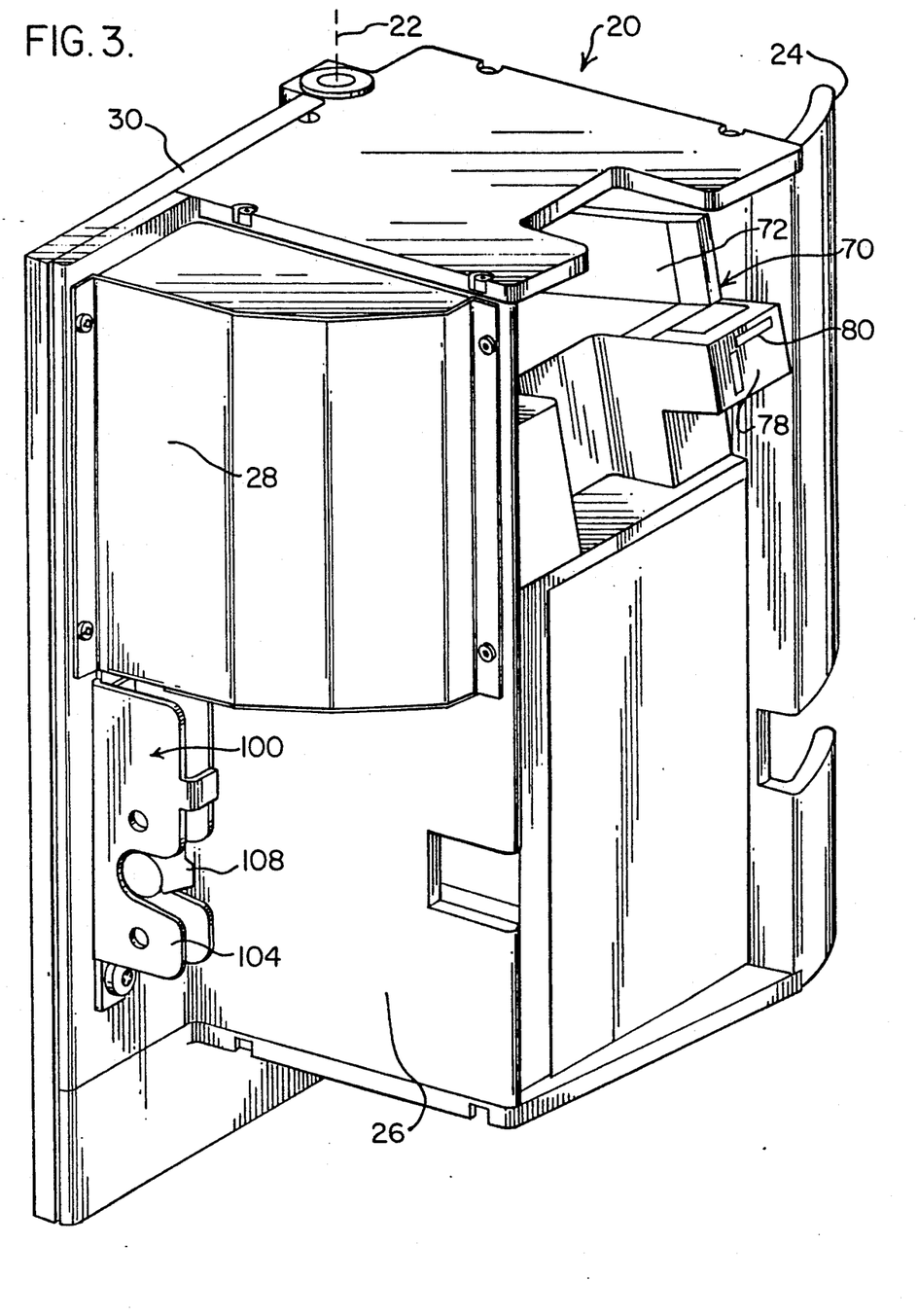
FIG. 3 is a rear perspective view of the door of the present invention.
Figure 4:
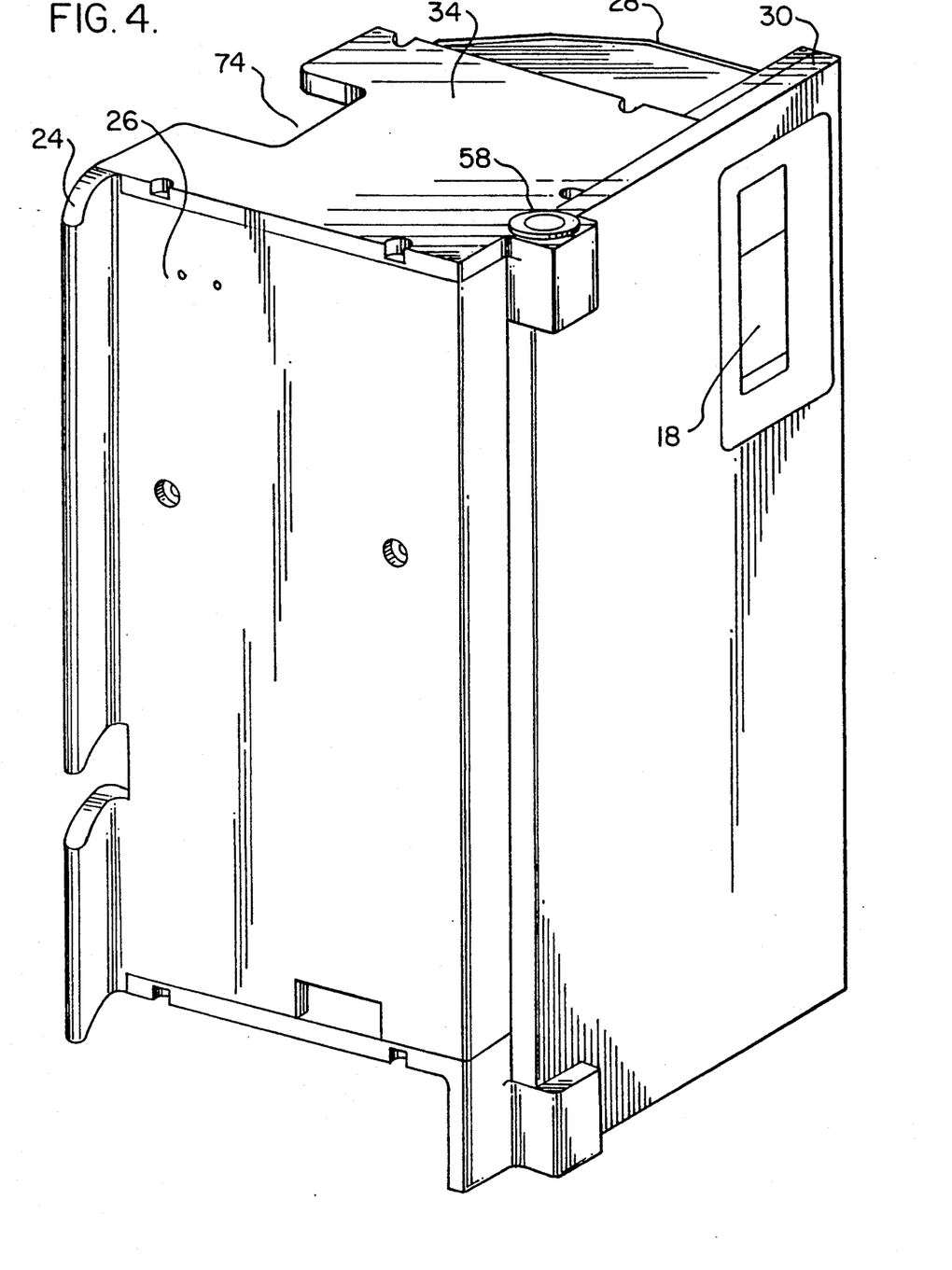
FIG. 4 is a front perspective view of the door of the present invention.

Door 20, shown in detail in FIGS. 3 and 4, includes tape cartridge tray 70 and latching mechanism 100 on the rear of door 20. The shape of door 20, including curved region 24, substantially square housing 26, substantially curved guard portion 28 and front plate portion 30, is such that opening 12 is blocked at all times, regardless of the position of door 20, to restrict access into the interior of the library module. This is an important concern in order to prevent damage to an operator or other person on the exterior of panel 14 from the robot (not shown) within the library module. The robot moves at high speed and with high forces.

Figure 5:
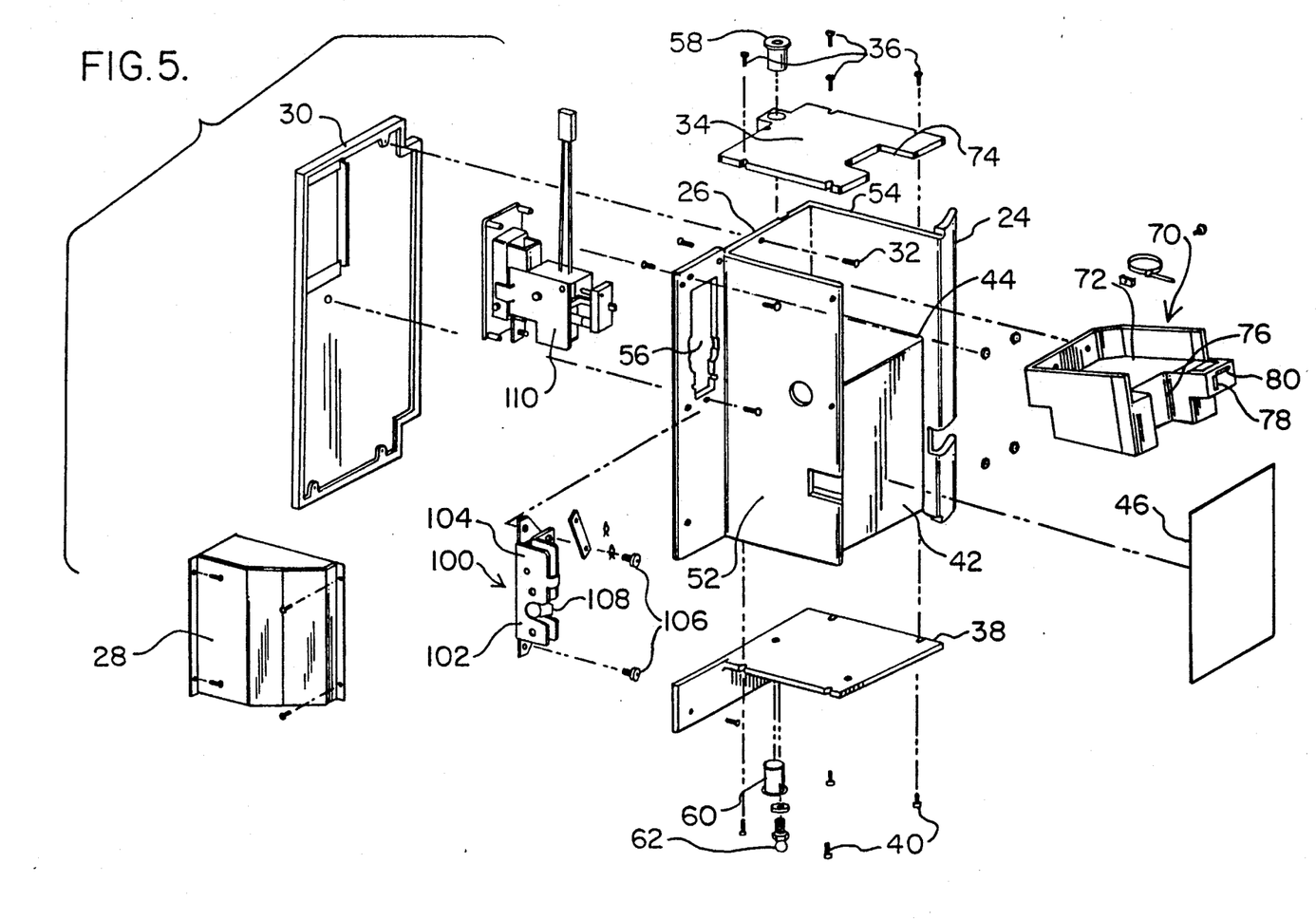
FIG. 5 is a an exploded view of the door of the present invention.

Housing 26, shown in FIG. 5, is secured to front plate 30 by screws 32 (all of which are not shown) with top plate 34 attached to housing 26 by screws 36. Lower plate 38 is secured to housing 26 by screws 40. Rear plate 42 is secured to housing 26 by screws 44 to provide a cable cover and label mounting plate. Label 46 is applied to rear plate 42 displaying the proper procedure for loading tape cartridges in door 20. Housing 26 and rear plate 42 define a mounting area for tape cartridge tray 70. Hole portion 56 is formed in housing 26 for mounting latch mechanism 110 therein.

Door 20 is pivotally mounted in opening 12 by pins (not shown) extending downward from panel 14 in opening 12 and engaging bushing 58 mounted in end plate 34 and another busing (not shown) extending upward from panel 14 into opening 12 and engaging bushing 60 mounted in end plate 38. Thus, door 20 freely rotates about axis 22 extending through bushings 58, 60 in end plates 34, 38.

Figures 6, 8:
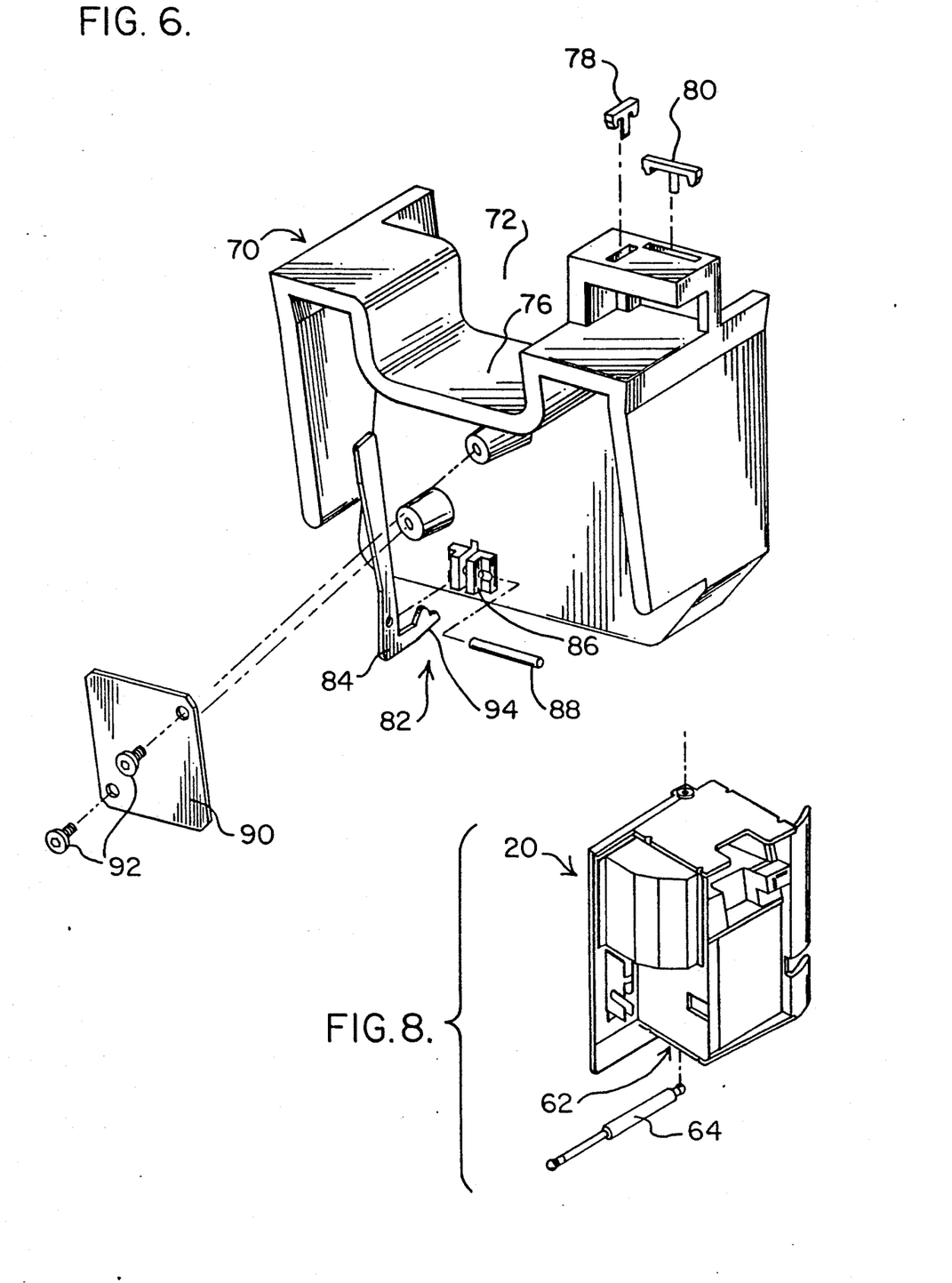
FIG. 6 is an exploded view of the sensor for the tape cartridge tray.
FIG. 8 is a perspective view of the door with the gas spring.
Figure 7:
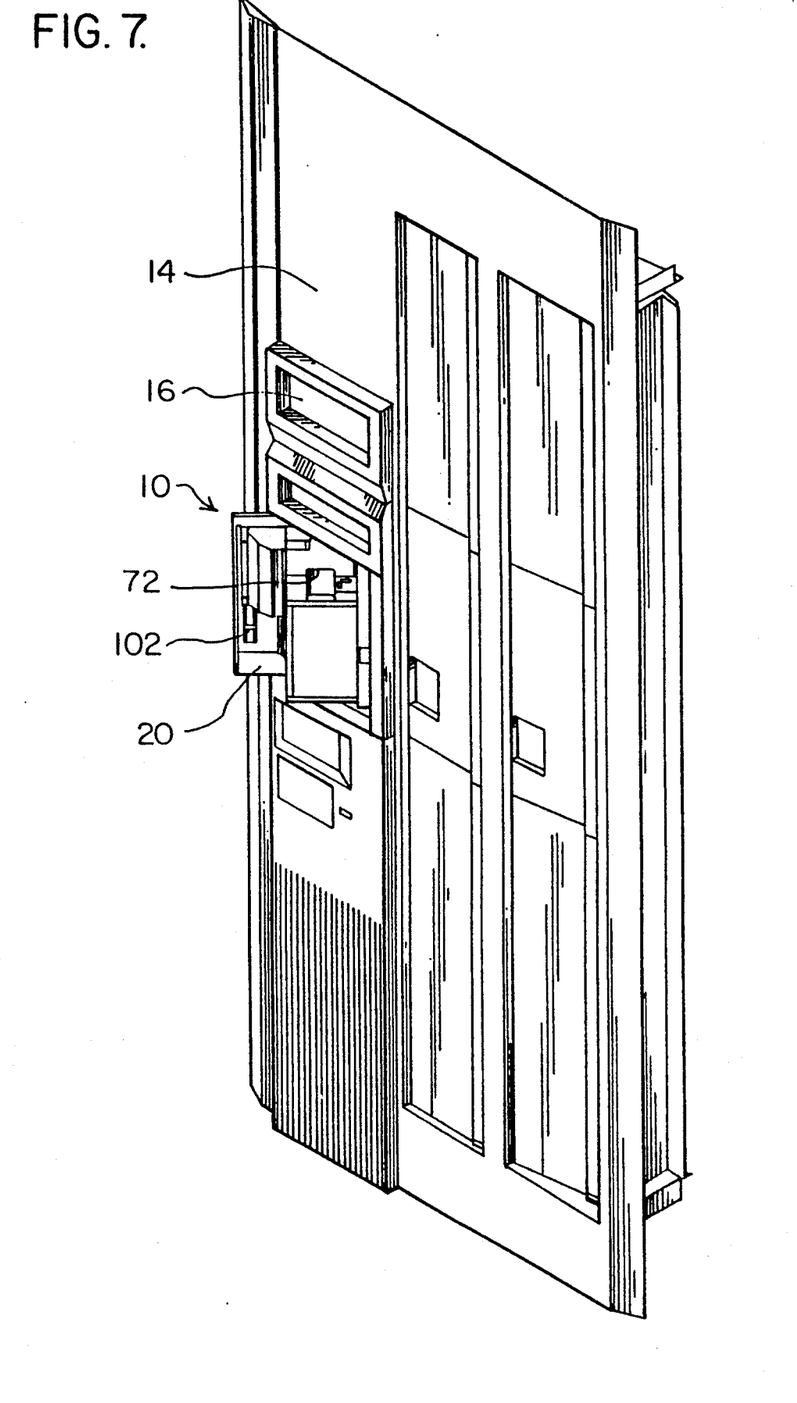
FIG. 7 is a perspective view of the present invention in the open position.

Door 20 has gas spring 64 mounted to panel 14 and balls stud 62 screwed to end plate 38. Gas spring 64 is resiliently biased when door 20 is in the closed position. When door 20 is unlatched, as described below, gas spring 64 will rotate door 20 to the open position.

Gas spring 64 also provides damping to prevent door 20 from damage due to slamming against panel 14. The access port is designed to operate at relatively high speeds so the damping is necessary. Gas spring will rotate door 20 at relatively high speed until door 20 nears the open position. At this point, gas spring 64 will provide dampening to slow the movement of door 20 to prevent damage to the door or panel.

Tape Cartridge Tray

Tape cartridge tray 70 is mounted in housing 26 between upper plate 34 and rear plate 42 by screws (not shown). Tape cartridge tray 70 is formed of injection molded plastic. Tape cartridge receiving portion 72 of tray 70 slants downward at a ten degree angle relative to housing 26. The slant of cartridge receiving portion 72 performs two functions. A tape cartridge placed in portion 72 will slide to the rear of cartridge receiving portion 72 so that the robot will be able to accurately and repetitively find the tape cartridge. Also, tape cartridges will be held, by gravity, from being accidentally dislodged from tray 70.

Notch 74, formed in top plate 34 and notch 76, formed in tray 70, shown in FIG. 3, allow clearance for the tape cartridge retrieval mechanism on the robot to grasp a tape cartridge held in tray 70. Notches 74, 76 also allow an operator to grasp a tape cartridge with their fingers to manually retrieve the tape cartridge held in tray 70.

Target inserts 78, 80 are firmly inserted into tray 70 to provide reference for the robot to the tray and cartridges. The target inserts are arranged perpendicularly to one another to provide vertical and lateral alignment for the robot. The robot used by the preferred embodiment includes optical sensing devices which use target inserts 78, 80 to align the robot in precise position to retrieve or load a tape cartridge from or into tray 70. In one preferred embodiment, tray 70 is formed of a white injection molded plastic. Target inserts 78, 80 are formed of black plastic so that the optical sensing devices can easily distinguish the reference inserts from their background. Target inserts 78, 80 often incur abrasive handling, either from the robot, or in handling. Therefore, inserts 78, 80 are quickly and easily replaced with new inserts as necessary.

Sensing mechanism 82 is mounted on tray 70 beneath cartridge seating portion 72, as shown in FIG. 6. "L"-shaped arm 84 is pivotally mounted on tray 70 in mounting bracket 86 by pin 88. Circuit card 90, which has an optical sensor mounted thereon (not shown) is mounted over arm 84 by screws 92. Arm portion 94 extends into tape cartridge receiving portion 72 so that once a tape cartridge is fully inserted into tray 70, arm 84 is pivoted relative to the optical sensor to activate the sensor which then sends a signal to the operating system. The operating system is thus able to sense whether a cartridge is present in tray 70

Latching Mechanism

Latching mechanism 100, shown in FIGS. 3 and 5, secures door 20 from accidental movement during the robot operation, which could result in damage to the system. Latch 102 includes bracket 104 mounted onto housing 26 by screws 106. Latch arm 108 is pivotally mounted in bracket 104 and resiliently biased therein (not shown). Latch arm 108 engages a pin formed on panel 14 to prevent door 20 from rotating. Latch handle 18, mounted on the exterior of front plate 30 through opening is connected to a lever (not shown) which actuates latch arm 108 from a latched position engaging the panel pin to an unlatched position disengaging from the panel pin. When latch handle 18 is lifted, latch arm 108 is disengaged from the panel pin and door 20 is free to rotate. The present invention is not meant to be limited to this descriptive latch mechanism. Other latch mechanisms, including well-known latch mechanism, are also considered to be within the scope of the claimed invention.

Actuator 110 is connected to the operating system of the library and to latch mechanism 100 to prevent latch arm 108 from disengaging from the panel hook until the operating system activates it. The operating system will not actuate the latch mechanism 100 during operation of the robot in loading or retrieving a cartridge from tray 70 or when a cartridge is improperly loaded into tray 70 to prevent damage to the system.

Operation of the Access Port

Access port 10 operates through the combination of the operating system and manual operation. Door 20 is normally in the closed and unlocked position. When a single tape cartridge is to be loaded into the library, either for storage or for direct input into a tape drive unit, the operator opens the door by activating latch 102. The door will be rotated by the action of the compressed gas spring. A tape cartridge is then loaded into tray 70. If the tape cartridge is not fully inserted into tray 70, sensor arm 84 will not activate the optical sensor on card 90. The operating system will prevent door 20 from being rotated back until the tape cartridge is full seated in tray 70. Once the optical sensor has been activated, the operating system will allow door 20 to be rotated until latch 100 is fully engaged. Door 20 will be electrically locked until the robot picks up the cartridge and transfers the tape cartridge to storage or to a tape drive. The display will show the progress of the operation.

Once the latch has been fully engaged, the operating system will move the robot into position. The optical sensing device on the robot will sense perpendicularly aligned target inserts 78, 80 to align the tape cartridge retrieval mechanism with tray 70. The tape cartridge retrieval mechanism will grasp the tape cartridge within notches 74, 76 and retrieve the tape cartridge from tray 70. The robot will then transfer the tape cartridge to a tape drive unit, or transfer the tape cartridge to storage in the library system.

Retrieval of a single tape cartridge from the library system also requires notification through the operating system. The robot is sent to the location of the single tape cartridge to retrieve the tape cartridge. The robot then transfers the tape cartridge to tray 70 by using the optical sensing device to align with target inserts 78, 80. The tape cartridge retrieval mechanism drops the tape into the angled tape cartridge receiving portion 74 of tray 70. The weight of the tape cartridge causes it to drop into position. Once the tape cartridge is in position, sensor arm 84 activates the optical sensor on circuit card 90 to signal the operating system that the tape cartridge is in proper position. The operating system then activates actuator 110 to allow latch 102 to be disengaged when the operator lifts handle 18. The status of the tape cartridge and latch 102 is displayed on the alphanumeric display. The operator disengages the latch and rotates door 20 fully open. The tape cartridge can then be retrieved and door 20 rotated until latch 102 is engaged.

The access port of the present invention allows single tape cartridges to be loaded or retrieved in an automated tape cartridge library system without interfering with the operation of the system. The access port is given priority over other operations and can quickly transfer the single tape cartridge between operations or while the particular robot is not in use. The safety of the operator is not impaired since the opening into the library is blocked at all times.

The above description of a preferred embodiment is for illustrative purposes only and is not meant to limit the scope of the claimed invention. Other embodiments and modifications are considered to be within the spirit and scope of the invention as claimed.

We claim:

1. A method for loading and retrieving single tape cartridges into and out of an automated tape cartridge library system, said method comprising the steps of:
    providing a rotatable door in an automated tape cartridge library system that pivots between a first position on the exterior of the library system and a second position on the interior of the library system;

inserting a single tape cartridge on a tray affixed to one side of said door while said door is in one of said first position or said second position;

rotating said door to the other of said first position and said second position; and retrieving said single tape cartridge from said tray.

2. The method of claim 1 wherein said method further comprises the steps of:

providing latching means for preventing the accidental movement of said door;

providing actuating means for preventing accidental unlatching of said door;

activating said actuating means to allow said door to be unlatched prior to said rotation of said door; and unlatching said door prior to said rotation of said door.

3. The method of claim 1 wherein said method further comprises the steps of:

providing a sensor on said door to sense when a tape cartridge has been fully inserted in said tray; and preventing said door from rotation until said sensor has sensed that a tape cartridge has been fully inserted in said tray.

* * * * *